United States Patent
Buss et al.

(10) Patent No.: US 6,602,155 B2
(45) Date of Patent: Aug. 5, 2003

(54) PIVOTING IDLER ASSEMBLY FOR BELT DRIVE MOWER

(75) Inventors: Steven Henry Buss, Horicon, WI (US); Todd Lynn Smith, Beaver Dam, WI (US)

(73) Assignee: Deere & Company, Moline, IL (US)

( * ) Notice: Subject to any disclaimer, the term of this patent is extended or adjusted under 35 U.S.C. 154(b) by 31 days.

(21) Appl. No.: 09/923,738

(22) Filed: Aug. 7, 2001

(65) Prior Publication Data

US 2003/0032508 A1 Feb. 13, 2003

(51) Int. Cl.$^7$ ................................................. F16H 7/12
(52) U.S. Cl. ...................... 474/135; 474/117; 474/133; 474/138; 474/101
(58) Field of Search ................... 474/135, 114–117, 474/136, 101, 133, 138, 110, 109, 139; 411/516; 56/15.2, 11.08, 16.3, 15.3

(56) References Cited

U.S. PATENT DOCUMENTS

| | | | | |
|---|---|---|---|---|
| 3,142,193 A | * | 7/1964 | Polko et al. | 474/110 |
| 3,592,517 A | * | 7/1971 | Harris | 384/215 |
| 3,840,253 A | * | 10/1974 | Federspiel | 411/516 |
| 3,992,001 A | * | 11/1976 | Martin | 271/184 |
| 4,102,114 A | * | 7/1978 | Estes et al. | 56/15.2 |
| 4,132,121 A | * | 1/1979 | Clarke | 56/11.8 |
| 4,213,288 A | | 7/1980 | Takeuchi et al. | |
| 4,276,038 A | * | 6/1981 | Kraft | 474/110 |
| 4,277,240 A | * | 7/1981 | Kraft | 474/110 |
| 4,299,584 A | * | 11/1981 | Sproul | 474/135 |
| 4,301,902 A | * | 11/1981 | Gatsos et al. | 474/1 |
| 4,310,082 A | * | 1/1982 | Elmy et al. | 192/218 |
| 5,226,248 A | * | 7/1993 | Pollard | 172/123 |
| 5,769,747 A | | 6/1998 | Kuhn et al. | |
| 5,937,625 A | | 8/1999 | Seegert | |
| 6,065,276 A | | 5/2000 | Hohnl et al. | |
| 6,176,071 B1 | | 1/2001 | Thorman et al. | |

FOREIGN PATENT DOCUMENTS

| | | |
|---|---|---|
| DE | 272011 | 3/1914 |
| DE | 399094 | 7/1924 |
| DE | 2416806 A1 * | 10/1975 |
| EP | 0038233 | 10/1981 |
| GB | 1143961 | 2/1969 |
| GB | 1327693 | 8/1973 |

* cited by examiner

*Primary Examiner*—Marcus Charles

(57) ABSTRACT

An idler assembly which is easily removable from a mower deck is disclosed. The idler assembly is rotatably mounted to the mower deck about a shouldered shaft and held in place by an easily removable spring clip. An idler pulley is rotatably attached to the other end of the idler arm. A spring is connected to a spring clip which is secured to the top of the idler arm. The spring causes the idler arm to rotate about the shouldered shaft and forces the idler pulley to apply tension to the drive belt. The idler arm also includes an extension which protrudes beyond the radius of the idler pulley to contact a snubber or bumper. The snubber is secured to the mower deck by a snubber bracket.

5 Claims, 4 Drawing Sheets

PIVOTING IDLER ASSEMBLY FOR BELT DRIVE MOWER

BACKGROUND OF THE INVENTION

1) Field of the Invention

The present invention generally relates to a drive structure for a lawn and garden tractor that carries and powers an implement such as a rotary mower. More specifically, though not exclusively, the present invention relates to a pivoting idler assembly for a belt driven mower which is easily removable.

2) Related Art

There are many conventional mowing vehicles which use a belt and pulley system to transmit power from a vehicle power source, such as the vehicle's crank shaft or transmission, to the blades of the mower. A drive assembly typically transfers power from the vehicle power source to a rotating drive pulley. The rotating drive pulley engages a drive belt which in turn powers a plurality of blade pulleys. The blade pulleys are connected to corresponding blade spindles to turn the mower blades. An idler pulley is typically installed to engage and tension the relatively slack or loose portion of the drive belt. Proper tensioning of the drive belt ensures the proper friction between the drive belt and the blade pulleys to prevent slippage. The belt tension applied by the idler pulley also generally prevents slack from accumulating in the belt, and thereby generally prevents the belt from becoming disengaged from the various pulleys during operation.

Conventional tensioning mechanisms provide a tension spring mounted to the idler arm for pulling the idler arm in a direction that will press the idler pulley against the belt and thereby tension the belt.

Occasionally, a large amount of tension can be placed upon the drive belt by other pulleys. This situation occurs when the mower blades strike an object and/or decelerates rapidly. The large amount of tension applied to the drive belt will pull or move the idler pulley and idler arm to such a degree that a condition known as belt whipping occurs. Belt whipping can cause the belt to disengage one or more of the pulleys. To limit the idler arm movement, many conventional mower decks include a bumper mechanism that abuts the idler arm. The bumper helps to prevent the belt from disengaging the pulleys after an obstruction has been struck or another situation applies a great amount of tension to the belt.

Current idler assemblies contact the bumper over the idler pulley. This makes removal of the idler pulley difficult and often requires that additional parts, such as the bumper, also be removed prior to replacement of the drive belt. It is therefore desirable to have an idler assembly in which the bumper is contacted beyond the radius of the idler pulley.

Further, most conventional idler assemblies are secured to the mower deck with a bolt which must be installed or removed from underneath the mower deck. This forces the user to access both the top and bottom of the mower deck. This increases the amount of labor necessary to remove or install the idler assembly. It is therefore desirable to have an idler assembly which is easily removable by simply accessing parts on top of the mower deck.

BRIEF SUMMARY OF THE INVENTION

It is therefore an objective of the present invention to provide an idler assembly which overcomes most or all of the above-listed disadvantages.

It is another objective of the present invention to provide a pivoting idler assembly which is easily removable from a mowing deck for servicing or replacement.

It is a further objective of the present invention to provide an idler assembly which contacts a bumper or snubber beyond the radius of the idler pulley.

An idler assembly constructed in accordance with the teachings of the present invention includes a shouldered shaft mounted through a bracket to a mower deck by a bolt or other securing device. An idler arm includes a hole which corresponds to the width of the shouldered shaft. The idler arm is then placed over the shouldered shaft for pivotal rotation about the shouldered shaft. The idler arm is secured to the shouldered shaft by a spring clip or other easily removable securing mechanism. An idler pulley is rotatably secured to the opposite end of the idler arm. A spring retaining bracket is also secured to the idler arm. A spring connected to the spring retaining bracket provides the necessary tension force for the idler assembly.

The idler arm preferably includes an extension which protrudes beyond the radius of the idler pulley. The extension forms the point of contact of the idler arm with a bumper or snubber. The snubber is attached to the mowing deck by a snubber bracket. In this manner, neither the snubber nor the snubber bracket need extend over the idler pulley.

DETAILED DESCRIPTION OF THE PREFERRED EMBODIMENT

Figure 1:
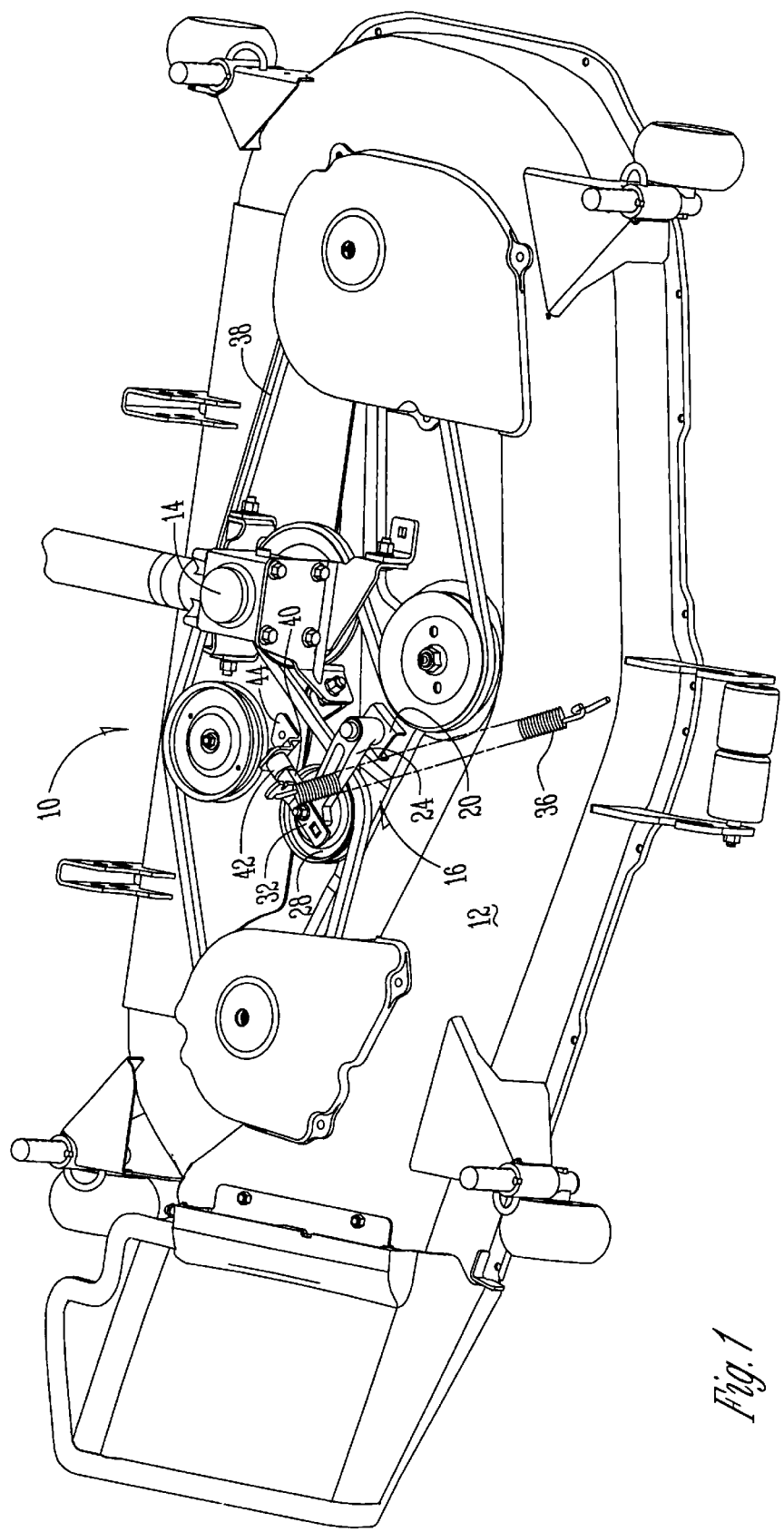
FIG. 1 is a perspective view of a mowing deck incorporating the idler assembly of the present invention.
Figure 2:
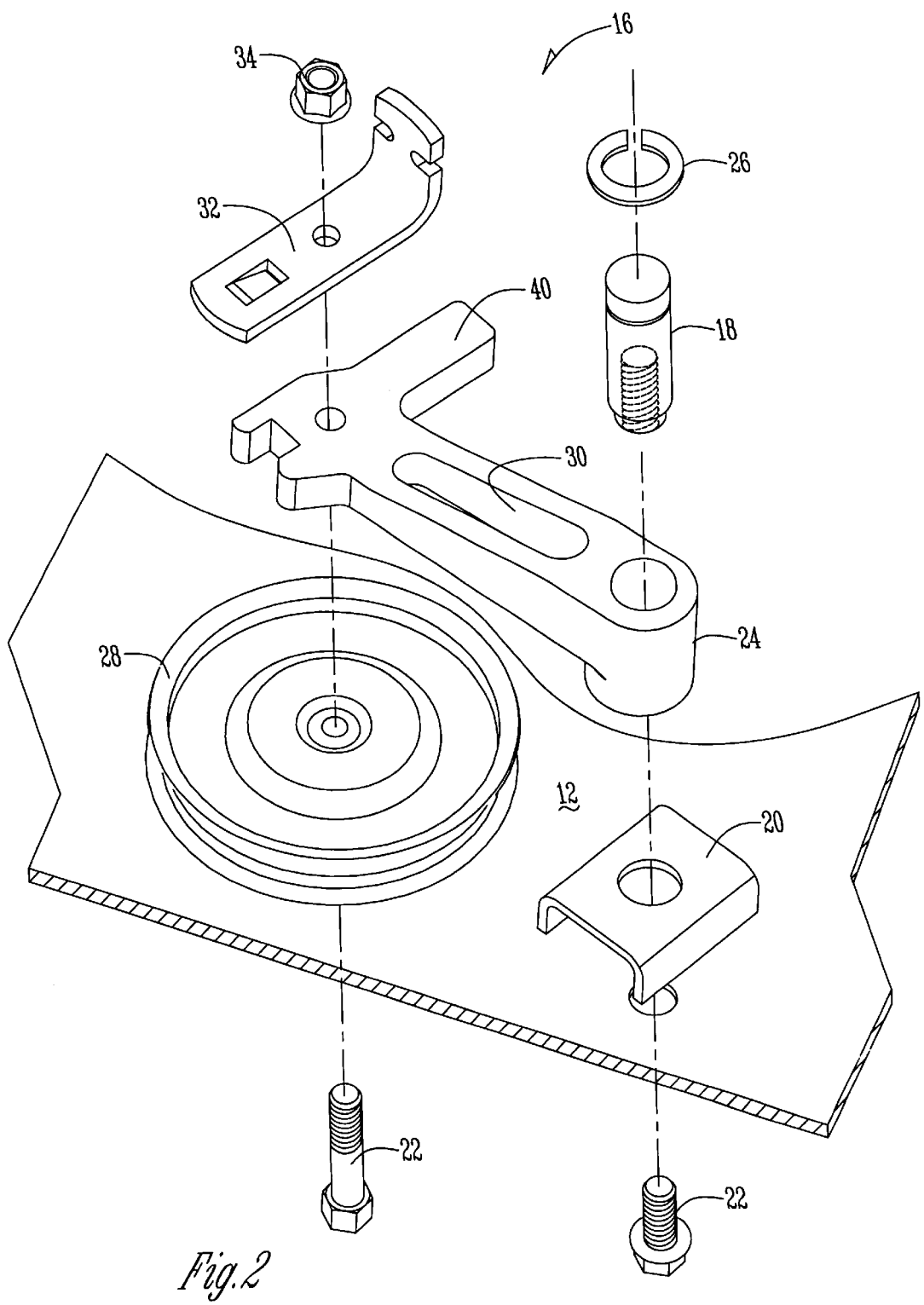
FIG. 2 is an exploded view of the idler assembly according to the present invention.

Referring to FIG. 1, a mowing deck 10 is shown with a deck housing 12. On top of the deck housing 12, a drive assembly 14 receives power from a vehicle's power source, such as the crank shaft or transmission, and turns a drive belt 38. A drive belt 38 is properly tensioned by the idler assembly 16. Generally, the idler assembly 16 is assembled as shown in FIG. 2. A shouldered shaft 18 is inserted through a support bracket 20 to matingly receive a bolt 22 through the mower deck 12. The idler arm 24 is then placed on the shouldered shaft 18 on top of the bracket 20. A spring clip 26 retains the idler arm 24 in a proper position on the shouldered shaft 18. The shouldered shaft 18 forms the vertical rotational axis for the idler arm 24.

At a point away from the rotational axis of the idler arm 24, an idler pulley 28 is rotationally secured to the idler arm 24 by a bolt 22 or other securing means. The bolt 22 also receives a spring retaining bracket 32 and is held in place by securing nut 34. As can be seen in FIG. 2, the idler arm 24 includes an extension 40. The extension 40 protrudes away from the main body of the idler arm 24, beyond the radius of the idler pulley 28.

Figure 3:
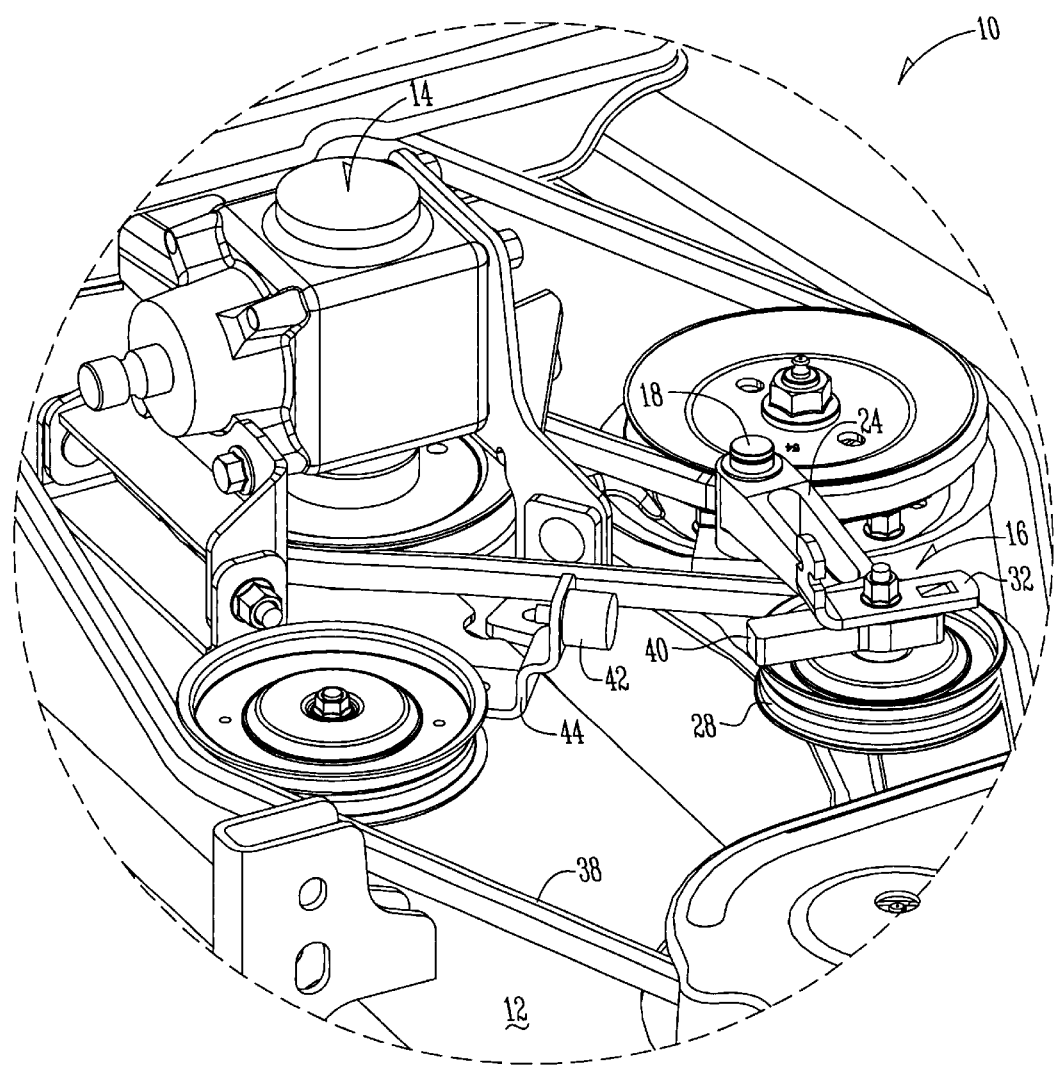
FIG. 3 is an enlarged sectional view of the mowing deck of FIG. 1 showing the idler assembly as it would appear during operation of the mowing deck.
Figure 4:
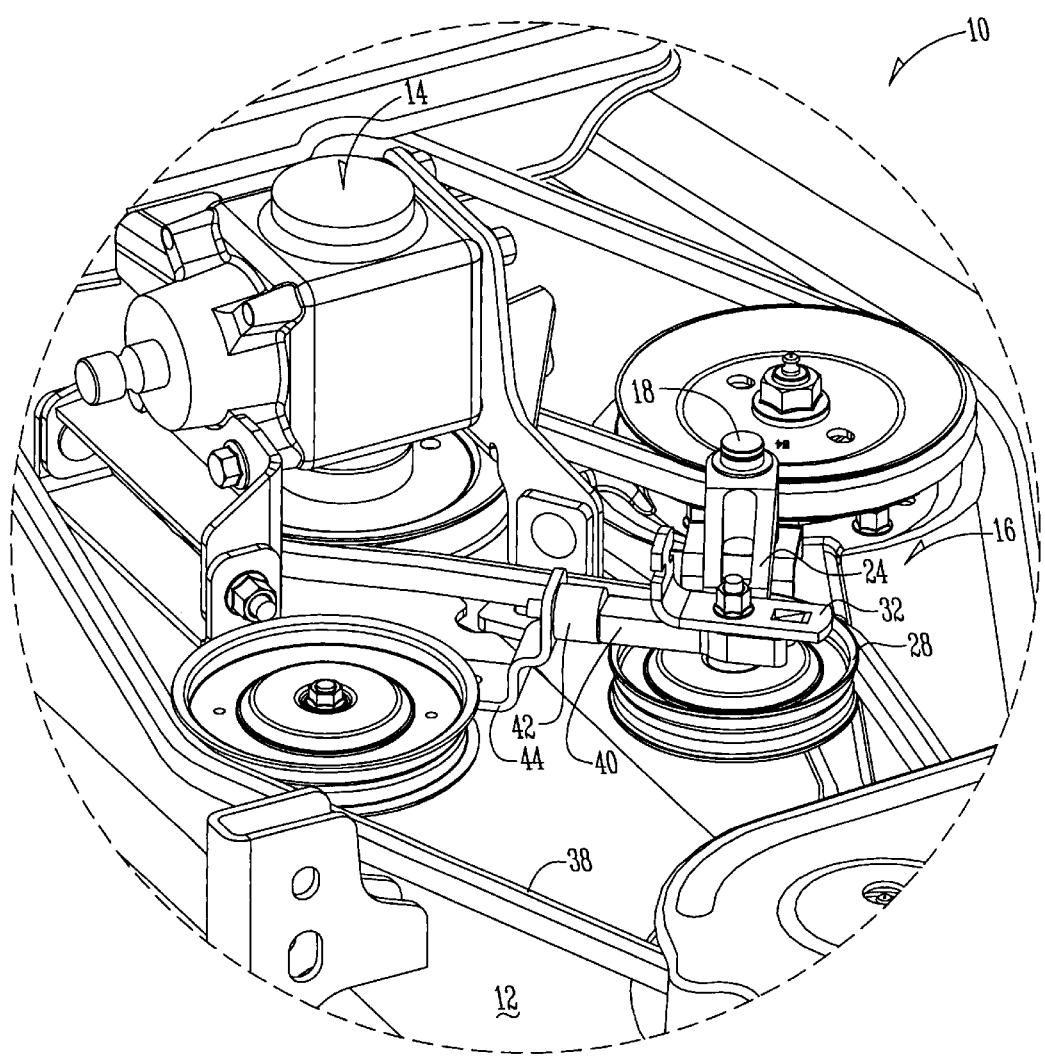
FIG. 4 is an enlarged sectional view of the mowing deck of FIG. 1 showing the idler assembly of the present invention in contact with the snubber.

As is shown in FIGS. 3 and 4, the extension 40 of the idler arm 24 contacts a snubber 42 beyond the radius of the idler pulley 28. The snubber 42 is secured to the mower deck 10 through a snubber bracket 44 which is welded or otherwise secured to the mower deck 10. In operation, a spring 36 is attached to the spring retaining bracket 32 of the idler assembly 16. This spring 36 causes the idler arm 24 to rotate about the shouldered shaft 18 pulling the idler pulley 28 against the drive belt 38 and thereby maintaining the necessary tension in the drive belt 38.

To remove the drive belt 38, it is also necessary to remove the idler assembly 16. To remove the idler assembly 16, the spring 36 is disconnected from the spring retaining bracket 32, causing the idler arm 24 to contact the snubber 42 as shown in FIG. 3. The spring clip 26 may then be simply removed allowing the user to lift the entire idler assembly 16, excluding the shouldered shaft 18, away from the mower deck 10. This allows the user to replace or remove the drive belt 38 and/or the idler assembly 16 without ever having to access the underside of the mower deck 10.

A general description of the present invention as well as a preferred embodiment of the present invention has been set forth above. Those skilled in the art to which the present invention pertains will recognize and be able to practice additional variations in the method and apparatus described which fall within the teachings of this invention. Accordingly, all such modifications and additions are deemed to be within the scope of the invention which is to be limited only by the claims appended hereto.

What is claimed is:

1. A tensioning apparatus for a mower deck assembly, the tensioning apparatus comprising:

an idler pulley;

an idler arm rotatably securing the idler pulley on top of the mower deck, the idler arm being pivotable about a vertical axis and including an extension protruding beyond the idler pulley; and a stationary snubber mounted to the mowing deck in a rotational plane of the idler arm to block the pivotal motion of the idler arm only when the idler pivots toward and contacts the snubber.

2. The tensioning apparatus of claim 1 wherein the idler arm is pivotably secured to the mower deck about a shouldered shaft.

3. The tensioning apparatus of claim 2 wherein the idler arm is retained on the shouldered shaft by a spring clip.

4. The idler assembly of claim 1 further comprising:

a spring retaining bracket secured to the idler arm; and a spring secured between the mower deck and the spring retaining bracket.

5. A method of removing an idler assembly from a mower deck, the method comprising:

removing a spring from a spring retaining bracket, the spring retaining bracket being secured to an idler arm, the idler arm being releasably secured to a shouldered shaft, causing the idler arm to pivot toward and contact a snubber;

removing a spring clip from a shouldered shaft; and lifting the idler assembly over the shouldered shaft.

* * * * *